United States Patent
Jamail et al.

(10) Patent No.: US 9,910,874 B1
(45) Date of Patent: Mar. 6, 2018

(54) SCALABLE ALERTER FOR SECURITY INFORMATION AND EVENT MANAGEMENT

(71) Applicant: EMC IP Holding Company LLC, Hopkinton, MA (US)

(72) Inventors: John M. Jamail, Sudbury, MA (US); Daniel B. Reich, Sudbury, MA (US); Paul W. Stoecker, Bear, DE (US)

(73) Assignee: EMC Corporation, Hopkinton, MA (US)

( * ) Notice: Subject to any disclaimer, the term of this patent is extended or adjusted under 35 U.S.C. 154(b) by 1012 days.

(21) Appl. No.: 13/930,074

(22) Filed: Jun. 28, 2013

(51) Int. Cl.
*G06F 17/30* (2006.01)

(52) U.S. Cl.
CPC .............................. *G06F 17/30303* (2013.01)

(58) Field of Classification Search
CPC ................................................ G06F 17/30303
USPC ........................................................ 707/692
See application file for complete search history.

(56) References Cited

U.S. PATENT DOCUMENTS

| | | | | |
|---|---|---|---|---|
| 5,850,511 A * | 12/1998 | Stoecker | ............ | H04L 12/2697 714/32 |
| 6,684,244 B1 * | 1/2004 | Goldman | ............ | H04L 41/0893 370/395.21 |
| 7,107,185 B1 * | 9/2006 | Yemini | ............ | G06F 11/2257 702/181 |
| 7,219,260 B1 * | 5/2007 | de Forest | ............ | G06F 11/1474 714/15 |
| 7,814,149 B1 * | 10/2010 | Stringham | ........ | G06F 17/30156 707/758 |
| 7,873,717 B1 * | 1/2011 | Woolway | .............. | G06F 21/552 709/223 |
| 8,127,307 B1 * | 2/2012 | Palekar | ............... | G06F 11/0727 719/318 |
| 8,606,644 B1 * | 12/2013 | Bruckhaus | ............. | G06Q 30/00 705/26.1 |
| 8,661,062 B1 * | 2/2014 | Jamail | ................ | H04L 63/1416 707/802 |
| 8,739,290 B1 * | 5/2014 | Jamail | ................ | G06F 11/0709 726/25 |
| 8,751,463 B1 * | 6/2014 | Chamness | ......... | G06F 17/30153 707/693 |
| 8,832,698 B1 * | 9/2014 | Chai | ..................... | G06F 9/4843 718/102 |
| 8,972,405 B1 * | 3/2015 | Chaulk | ............. | G06F 17/30194 707/737 |

(Continued)

*Primary Examiner* — Robert W Beausoliel, Jr.
*Assistant Examiner* — Arthur Ganger
(74) *Attorney, Agent, or Firm* — Ryan, Mason & Lewis, LLP (57) ABSTRACT

A methodology and related system operable to store a plurality of complex event processing (CEP) rules, the CEP rules being based on a plurality of events that are to be monitored. The CEP rules are pre-processed by, e.g., generating and storing a de-duplicated list of events from the plurality of events that are to be monitored. A received event from a received event stream is compared to events in the de-duplicated list of events and when a match between the received event (e.g., an event instance) and any one of the events in the de-duplicated list of events is detected, the received event (the event instance) is stored in an input repository. The plurality of CEP rules are then applied to the received event in the input repository, and any other previously stored events in the input repository.

20 Claims, 6 Drawing Sheets

(56) References Cited

U.S. PATENT DOCUMENTS

| | | | |
|---|---|---|---|
| 2005/0209914 A1* | 9/2005 | Nguyen | G06Q 10/02 |
| | | | 705/14.56 |
| 2008/0301135 A1* | 12/2008 | Alves | G06F 17/30442 |
| 2009/0198949 A1* | 8/2009 | Kuligowski | G06F 3/0605 |
| | | | 711/203 |
| 2009/0265288 A1* | 10/2009 | Chakravarty | G06N 5/022 |
| | | | 706/11 |
| 2011/0314148 A1* | 12/2011 | Petersen | G06F 11/3476 |
| | | | 709/224 |

* cited by examiner

| RULE REPOSITORY | |
|---|---|
| RULE 1 | A + B + C  WITHIN 30 SECONDS |
| RULE 2 | A THEN E THEN C |
| RULE 3 | X + E |
| RULE 4 | RULE 2 THEN RULE 3 |

| DE-DUPLICATED LIST OF EVENTS |
|---|
| A, B, C, E, X |

FIG.4B

INPUT REPOSITORY

| MATCHING EVENT | STREAM # | TIME STAMP |
|---|---|---|
| X | 2 | $T_0$ |
| A | 2 | $T_1$ |
| X | 1 | $T_1$ |
| E | 2 | $T_2$ |
| B | 1 | $T_3$ |
| C | 2 | $T_4$ |
| E | 1 | $T_5$ |
| C | 1 | $T_5$ |
| X | 2 | $T_5$ |

FIG.5

| RULE 1 | A | B | C | TIME CONSTRAINT SATISFIED? | TRIGGER ALERT |
|---|---|---|---|---|---|
|  |  |  |  |  |  |

| RULE 2 | A | E | C | SEQUENCE SATISFIED? | TRIGGER ALERT |
|---|---|---|---|---|---|
|  |  |  |  |  |  |

| RULE 3 | X | E | TRIGGER ALERT |
|---|---|---|---|
|  |  |  |  |

| RULE 4 | RULE 2 | RULE 3 | SEQUENCE SATISFIED? | TRIGGER ALERT |
|---|---|---|---|---|
|  |  |  |  |  |

SCALABLE ALERTER FOR SECURITY INFORMATION AND EVENT MANAGEMENT

TECHNICAL FIELD

The present disclosure relates generally to complex event processing, and more particularly to a scalable complex event processing approach in connection with security information and event management (SIEM) systems.

BACKGROUND

Event processing is a method of tracking and analyzing (processing) streams of information (data) about things that happen (events), and deriving a conclusion from them. Complex event processing (CEP) is event processing that combines data from multiple sources to infer events or patterns that suggest more complicated circumstances. One goal of CEP is to identify meaningful events (such as opportunities or threats) and respond to them as quickly as possible.

These events may transpire across various layers of an organization as sales leads, orders or customer service calls. Events may also comprise news items, text messages, social media posts, stock market feeds, traffic reports, weather reports, or other kinds of data. An event may also comprise an indication of a "change of state," e.g., when a measurement exceeds a predefined threshold of time, temperature, or other value.

In an information technology environment, events may transpire in an electronic network (e.g., an enterprise environment or across the Internet) and particular patterns of such events might be indicative of improper or unauthorized use of the electronic network and/or of data accessible via the electronic network. The more quickly such improper or unauthorized activity can be discovered, the more quickly appropriate action can be taken.

DESCRIPTION OF EXAMPLE EMBODIMENTS

Overview

Presented herein are techniques for performing complex event processing.

In one embodiment a methodology is provided that includes storing a plurality of complex event processing (CEP) rules, the CEP rules being based on a plurality of events that are to be monitored. The CEP rules are pre-processed by, e.g., generating and storing a de-duplicated list of events from the plurality of events that are to be monitored. A received event from a received event stream is compared to each of the events in the de-duplicated list of events and when a match between the received event (e.g., an event instance) and any one of the events in the de-duplicated list of events is detected, the received event (the event instance) is stored in an input repository. The plurality of CEP rules are then applied to the received event in the input repository, and any other previously stored events in the input repository.

Example Embodiments

Providing real-time alerting for complex event processing (CEP) is a major challenge for the security information and event management (SIEM) industry. As the stream of events increases (in both speed and number of possible events of interest) and alert pattern recognition become more complex, systems exhibit exponential growth in event processing computational challenges.

In accordance with embodiments described herein, a CEP alerter is configured to use rules to analyze an event stream in real-time to find events of interest. A rule, as used herein, is a defined pattern of events in, perhaps, a particular order that may or may not occur within selected minimum or maximum time spans between the events. Rules can be configured to "look for" a single unique event, a unique event that occurs a given number of times, multiple different events happening in a defined order or multiple events happening with conditional operators (e.g., and/or).

Conventional CEP implementations lack flexibility, making the creation of rules difficult. For instance, rules have to be written to account for a particular sequential order of events as such conventional CEP implementations analyze an event stream in real time and can not process (in real-time) events that occurred at an earlier time.

For example, if there were a rule to raise an alert when a mission critical file was deleted on a WINDOWS™ 2003 server, the rule might be configured to look for, e.g., Event ID 564 (Object Deleted). To determine the filename of the deleted file, a conventional CEP implementation would need to correlate the Handle ID found in the Event ID 564 event with the Handle ID in a corresponding Event ID 560 (i.e., an object was successfully granted a handle) that occurred before the Event ID 564 was generated. Therefore, conventional CEP implementations cannot alert on the deletion of mission critical files on Windows systems.

Additionally, conventional CEP implementations can have large computational overhead if the event that initiates a rule is common to multiple rules. That is, each time the conventional CEP implementation discovers an event that is the beginning point for a rule that requires a sequential series of events to generate an alert, the conventional CEP implementation instantiates the state of the rule in memory. It then begins the process of looking for the next event in that rule. If the first event is found again, then the conventional CEP implementation instantiates a second copy of that rule in memory and looks for the next event from the second instantiation as well. These rules must be kept in memory until a time window for the rule expires or the CEP implementation generates an alert. The time window might be on the order minutes, hours or even days.

The conventional methodology severely limits the number of rules a user of a conventional CEP implementation can activate at one time. For example, many larger users can only run 10-15 relatively simplistic rules (one event each) using a conventional CEP implementation. Given that some alerting modules have the potential to be configured to process hundreds of individual rules, because of the lack of processing power and memory, only a relatively small subset of these overall rules can be in force at any given time.

To overcome the aforementioned computational challenges and memory overhead of conventional CEP implementations, the CEP alerter described herein operates in stages, and takes advantage of the way events generate alerts. Specifically, it has been recognized that events that match a rule of interest often represent only a fraction of the total number of events received by a SIEM system. The CEP alerter described herein exploits this recognition to provide a more efficient CEP approach.

Figure 1:
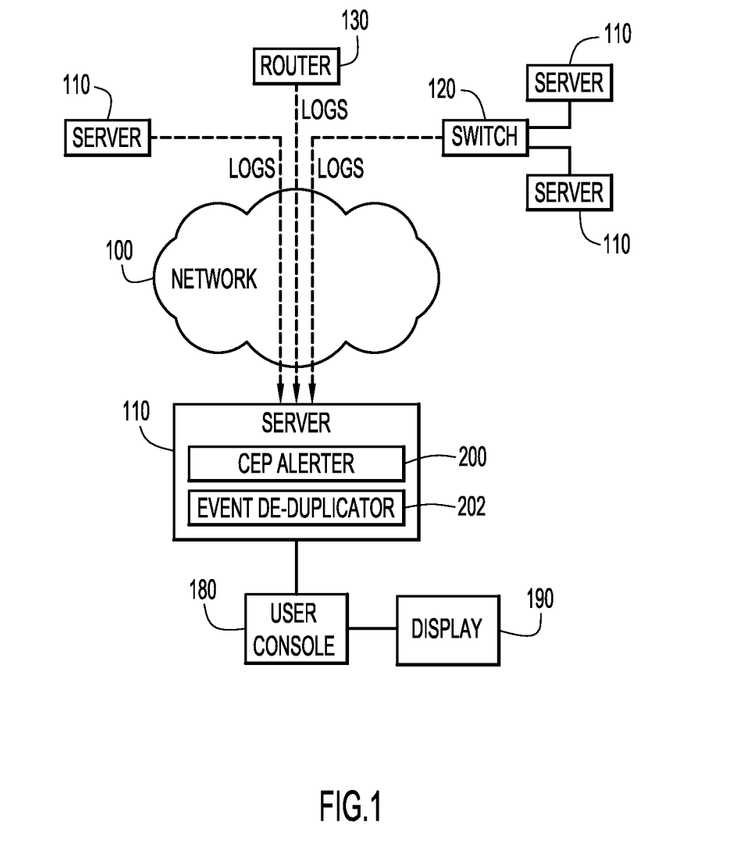
FIG. 1 is a schematic diagram illustrating a network environment in which embodiments of a complex event processing (CEP) alerter, in accordance with examples presented herein, may be deployed.

With reference to FIG. 1, a system operable in accordance with the principles described herein includes an electronic network 100 that interconnects several different components including, e.g., a plurality of servers 110, a switch 120, and a router 130. Network 100 also interconnects with CEP alerter 200 (hosted by any one or more servers). Details of CEP alerter 200 are provided below. As depicted in FIG. 1, CEP alerter 200 is configured to receive streams of events from the several depicted components interconnected via network 100. More specifically, CEP alerter 200 is configured to receive respective streams of events in the form of, e.g., logs (or similar event data), process those logs and provide an output indicative of a predetermined pattern that has been detected in one or more event streams. As will be explained more fully below, CEP alerter 200 makes use of an event de-duplicator 202 to help streamline certain processing activities. Also connected to CEP alerter 200 is a user console 180 that may have an attached display 190. User console 180 may be a general purpose computer configured to receive alerts from CEP alerter 200, notify a user through a display, or other notification mechanism such as email, wireless messaging, or the like. User console 180 may also be used to configure and load rules into CEP alerter 200. Those skilled in the art will appreciate that many more network connected devices, of the same or different type, may be deployed in a given network that is served by CEP alerter 200. Still other network connected devices or targets might be served by CEP alerter 200 including, but not limited to, operating systems, databases, applications and firewalls, among others.

Network 100 may be any wired or wireless electronic network such as a local area network (LAN), wide area network (WAN), the Internet, a private network, or any suitable electronic physical plant that enables connectivity between the several other components connected thereto.

Those skilled in the art will appreciate that, although CEP alerter 200 is being described in connection electronic network 100 and events (such as logs) generated by interconnected equipment in that electronic network, the principles described herein are equally applicable to other types of events including, e.g., sales leads, orders, customer service calls, news items, text messages, social media posts, stock market feeds, traffic reports, weather reports, or indications of a "change of state" of some value being monitored.

Figure 2:
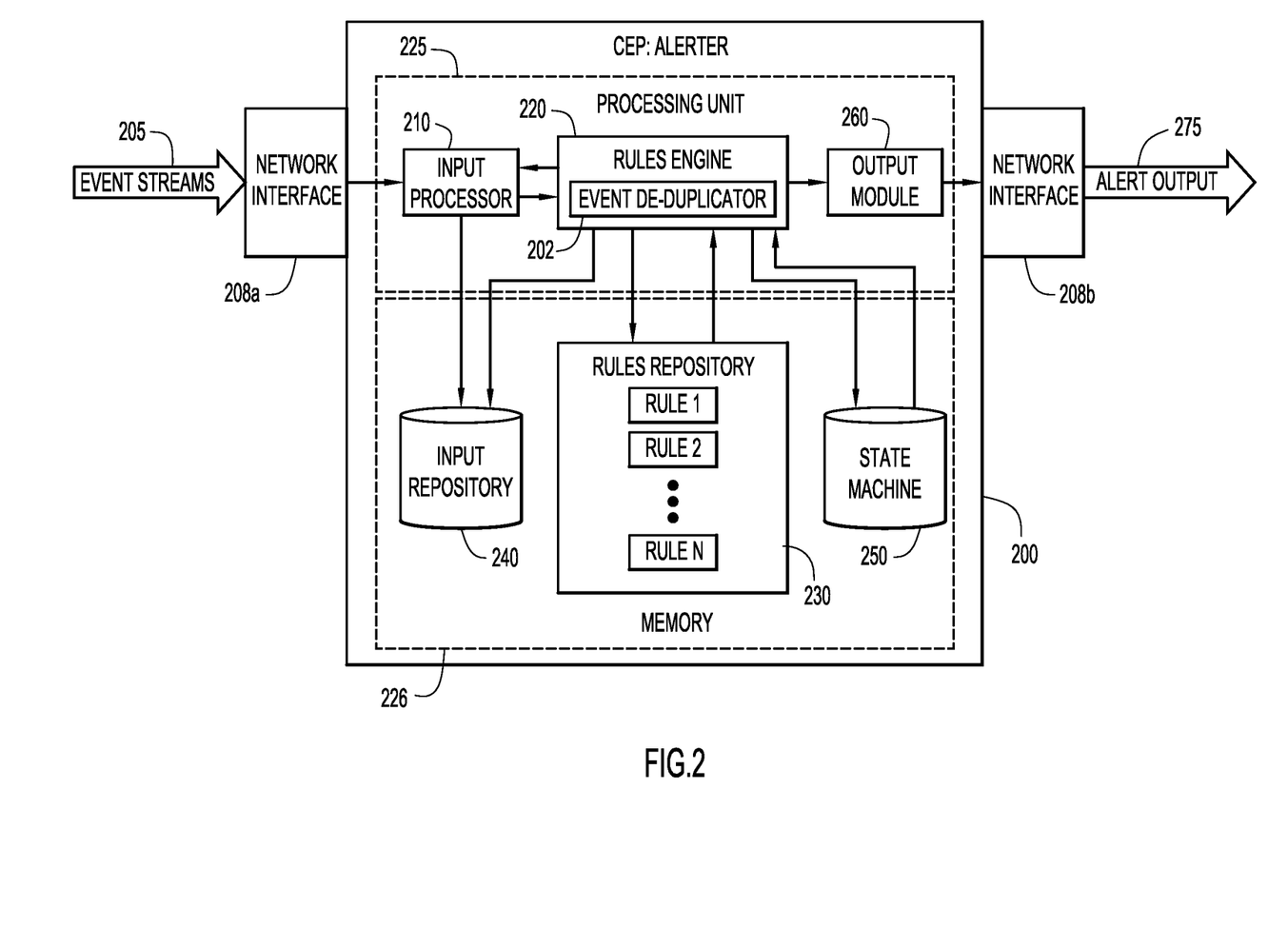
FIG. 2 is an example block diagram of a CEP alerter in accordance with an example presented herein.

CEP alerter 200 may be implemented on a server computer (the physicality of which is described more fully with respect to FIG. 2) and comprises logic and/or software instructions configured to receive data (e.g., events) from the several network-connected components, process that data, and provide an appropriate alert to a user upon detection of a particular pattern of events defined by one or more rules. As shown in FIG. 1, logs generated by the several network connected devices arrive at CEP alerter 200 via network 100.

Reference is now made to FIG. 2, which is an example block diagram of CEP alerter 200 in accordance with an example presented herein. CEP alerter 200 in accordance with the depicted embodiment comprises an input processor 210, a rules engine 220, a rules repository 230, an input repository 240, a state machine 250 and an output module 260. Network interfaces 208a and 208b (which may be implemented as a single physical network interface) enable data to be received by CEP alerter 200 and enable data to be output by CEP alerter 200.

As indicated in FIG. 2, input processor 210, rules engine 220 and output module 260 may be collectively referred to as a processing unit 225, and input repository 240, rules repository 230 and state machine 250 may be collectively referred to or be implemented in memory 226.

Processing unit 225 may comprise, for example, a microprocessor, microcontroller or application specific integrated circuit (ASIC) that is configured to execute program logic instructions (e.g., software) for carrying out various operations and tasks of CEP alerter 200, as described herein. The functions of processor unit 225 may be implemented by logic encoded in one or more tangible computer readable storage media or devices (e.g., storage devices, compact discs, digital video discs, flash memory drives, etc. and embedded logic such as an application specific integrated circuit, digital signal processor instructions, software that is executed by a processor, etc.).

Memory 226 may comprise read only memory (ROM), random access memory (RAM), magnetic disk storage media devices, optical storage media devices, flash memory devices, electrical, optical, or other physical/tangible (non-transitory) memory storage devices. Memory 226 may store software instructions for performing the functions of CEP alerter 200. Thus, in general, memory 226 may comprise one or more computer readable storage media (e.g., a memory storage device) encoded with software comprising computer executable instructions that, when executed (e.g., by processing unit 225) are operable to perform the operations of CEP alerter 200 described herein.

Memory 226 may also comprise physical repositories implemented through any combination of conventional Relational Database Management Systems (RDBMSs), Object Database Management Systems (ODBMSs), in-memory Database Management Systems (DBMSs), or through any other equivalent facility. Moreover, the individual components depicted within memory 226 may be combined into a single component, or distributed into multiple components (as depicted) as long as the data being stored therein is accessible to processing unit 225.

At a high level, event streams 205 are received at network interface 208a, the event streams 205 are processed in accordance with the principles described herein, and then an alert 275, as appropriate, may be output via network interface 208b (and/or directly to console 180).

Figure 3:
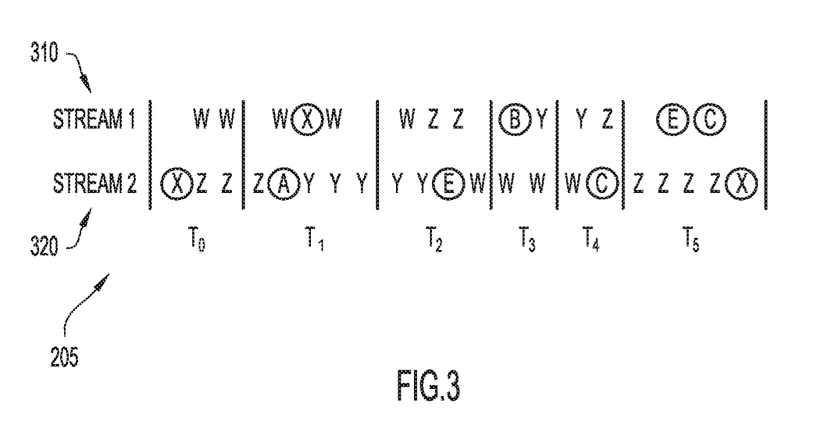
FIG. 3 depicts simplified examples of event streams, and identification of selected events of particular interest in those streams.

Reference is now made to FIG. 3, which depicts simplified examples of event streams, and of selected events of particular interest in those streams. More specifically, FIG. 3 shows event streams 205, which in this case comprises two separate streams: stream 1 310, and stream 2 320. The letters in the streams may be representative of virtually any type of event. However, for the purposes of discussion herein, each letter represents an event log generated by a component interconnected by network 100 in FIG. 1. Also shown are time periods $T_0$ through $T_5$ which are referred to in connection with the discussion of FIGS. 5 and 6.

Figure 4A:
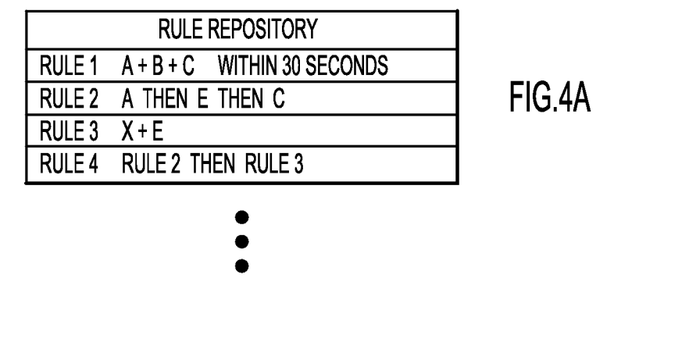
FIG. 4A is an example of a rules repository in accordance with an example embodiment.

FIG. 4A is an example of rule repository 230 in accordance with an example embodiment. As indicated, events are represented as individual letters. Rules stored in rules repository 230 are thus configured as various combinations of letters, timing of receipt thereof, and rules. For example, Rule 1 requires the receipt of events, A, B and C all within 30 seconds of each other. Rule 2 requires a specific sequence of events, namely A then E then C, without any time constraint. Rule 3 requires detection of events X and E. Finally, Rule 4 is based on a sequence of rules, namely Rule 2 then Rule 3.

As can be seen from rule repository 230, multiple different events are to be tracked by CEP alerter 200. However, as can be further seen, several of the events are duplicated among the rules. For example, both Rules 1 and 2 are "looking for" event A. Those two rules are both likewise "looking for" event C. Similarly, Rule 2 and Rule 3 have event E in common, and Rule 4, which is based on the satisfaction of both Rule 2 and Rule 3 (in that sequence) likewise have event E in common.

Figure 4B:
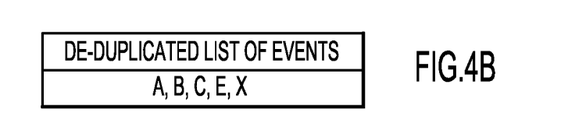
FIG. 4B is an example of a de-duplicated list of events gleaned from the several rules stored in the rules repository.

In an effort to streamline the processing and overhead of CEP alerter 200, a de-duplicated list of all events that are to be detected is generated. Such a list is depicted in FIG. 4B. That is, of all the events that are to be detected, the de-duplicated list of FIG. 4B lists each such event only once. For example, even though event A appears twice expressly and once impliedly through Rule 4 (which is based in part on Rule 2, which includes event A), event A appears only once in the de-duplicated list. Such a de-duplicated list is then used to parse incoming event streams 310, 320. That is, in one embodiment, the de-duplicated event list of FIG. 4B is used as a mask, filter, or matching set that is applied to incoming event streams 310, 320 at input processor 210. The de-duplicated list may be generated by event de-duplicator 202 embodied in, e.g., rules engine 220, and stored in, or made available to, input processor 210, which is operable to parse incoming event streams.

Figure 5:
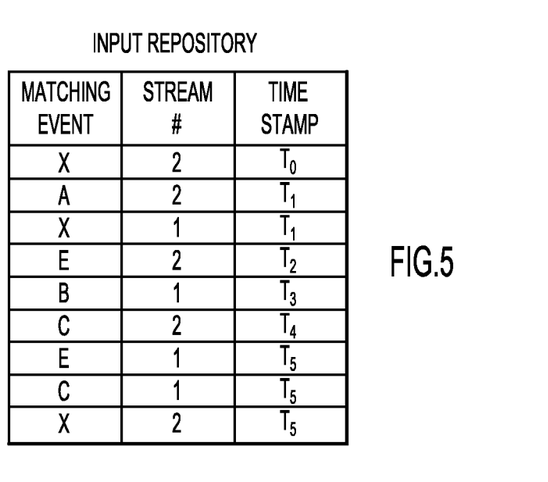
FIG. 5 depicts an example input repository that stores events consistent with the de-duplicated list of events.

FIG. 5 depicts an example of input repository 240 that stores detected instances of events consistent with the de-duplicated list of events. More specifically, upon detection (e.g., a matching) of an event in the de-duplicated list of events with an event in incoming event streams 310, 320, that event instance is stored in input repository 240. Thus, in FIG. 5, of all the events in the de-duplicated list, event X (circled in FIG. 3) is the first to appear in either event stream 310 or 320. Event X is considered a matching event, and is thus added to, in this case, the first row of input repository 240 (which is arranged as, e.g., a relational database). Event X was detected in Stream 2 320 and within time period $T_0$. It is noted that the timestamp could be a timestamp that is part of the event (or log) itself, or it may be a timestamp associated with a clock of input repository 240. Timestamps may be different for each event recorded in input repository 240, but for purposes of discussion herein the less granular time periods depicted in FIG. 3 and indicated in FIG. 5 are sufficient.

The purpose of keeping track of a timestamp for each event is at least two-fold. First, certain rules are based on a specific sequence of events, and thus knowing when events occur in time may be important to satisfy a given rule. Second, at some point, detected or matched events stored in input repository 240 become "stale," in that the event is sufficiently old that no in-force rule would rely on that event. Thus, the timestamp information can be used to remove events in input repository 240 that are older than a predetermined threshold, or older than any time window in which any given rule would rely on the event.

As can be seen through further inspection of FIG. 5, input repository 240 is filled as instances of events in the incoming event streams 310, 320 match events in the de-duplicated list of events. Each row in input repository 240 includes, e.g., an event instance, an identification of a stream and a timestamp. Other elements that may be stored include, e.g., a matching log message itself in its entirety, or metadata or parsed metadata associated with the log. In FIG. 3, each of the matched event instances is identified by being circled.

Figure 6:
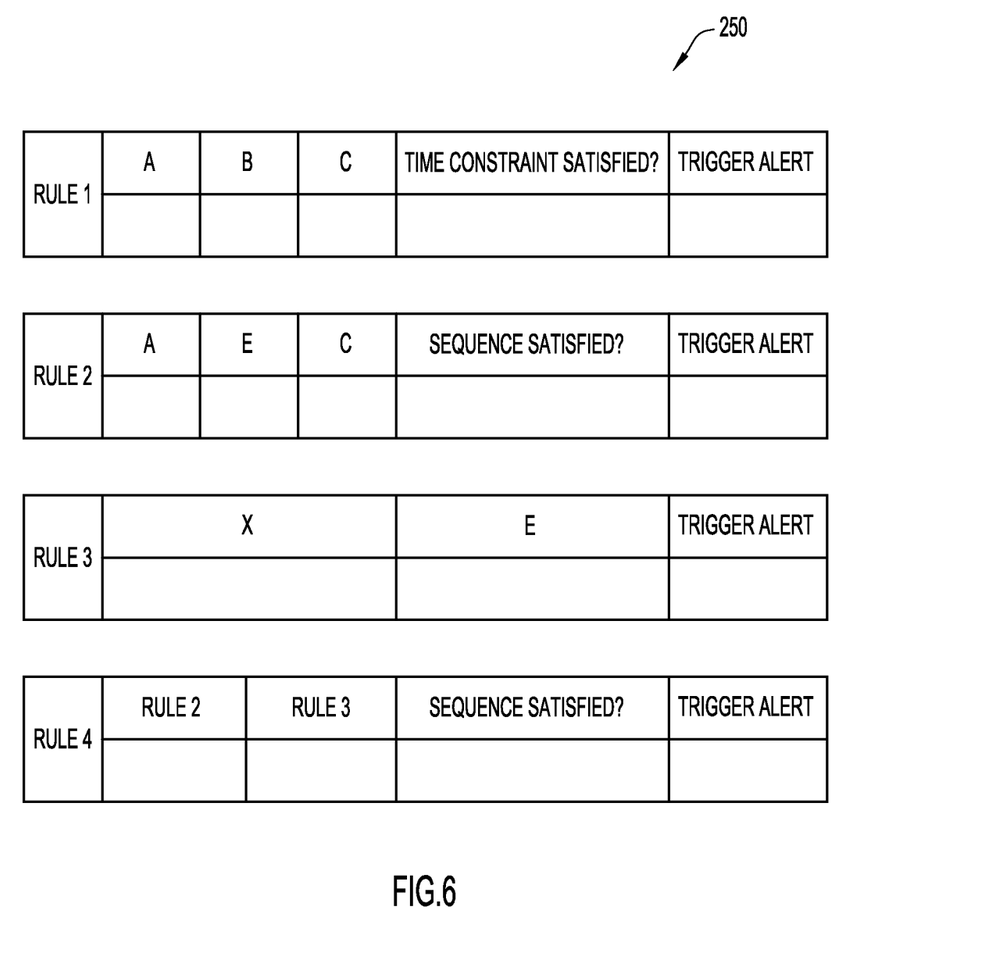
FIG. 6 depicts an example state machine, implemented as a relational database, operable with events processed by the CEP alerter described herein.

Reference is now made to FIG. 6, which depicts an example state machine 250, implemented as a relational database, which can be employed to keep track of rule satisfaction by CEP alerter 200. As can be seen in FIG. 6, each rule is accounted for and each event and constraint that contributes to the satisfaction of each rule is included. For example, Rule 1 is satisfied when events A, B and C are found in input repository 240, all within a 30 second time constraint. Multiple instances of Rule 1 within state machine 250 may be launched to account for detection of individual instances of A, B or C since the order of the events for this rule is not critical. If each of A, B and C are detected within the 30 second time constraint, then state machine 250 might indicate the same in the "trigger alert" field of the relational database. In one possible implementation, a separate daemon or monitoring application can be configured to detect new indications in the "trigger alert" fields of the several rules and, when an alert is indicated, to cause output module 260 to initiate an alert. It should be noted that an absence of an event may trigger an alert as well. For example, if event A is detected, but event B is not detected within a given time frame, then such a series of occurrences (or non-occurrences) may satisfy a rule, and thus trigger an alert. It is noted that it may be beneficial to employ non-blocking I/O to keep track of the several rules since a state machine is implemented rather than just opening threads. This can be achieved using a memory cache.

State machine 250 operates similarly for Rule 2. In this case, the particular sequence A, E and C satisfies the rule. As shown in FIG. 3, such a sequence is found in steam 2 320, and those events are likewise included in input repository 240 (FIG. 5) along with respective time stamps. It can be seen from FIG. 3 or FIG. 5 that event A has a time stamp of $T_1$, event E has a time stamp of $T_2$, and event C has a time stamp of $T_4$. Such time stamps confirm the indicated sequence thus triggering state machine 250 to indicate in the "sequence satisfied" field that the rule's sequence has been satisfied.

Rule 3 in state machine 250 would cause an alert upon detection of events X and E in input repository 240. An alert would be triggered in this case, at or after $T_1$.

Finally, Rule 4 is based on the satisfaction of two separate rules, and in a particular sequence, namely Rule 2 and then Rule 3. In this case, state machine 250 (or rules engine 220) need not necessarily access input repository 240 directly to update the respective fields of Rule 4. Instead, state machine 250 may simply track the satisfaction of Rule 2 and Rule 3 within relational database itself.

Thus, by taking advantage of the previously mentioned attributes of events and the manner in which they generate alerts, CEP alerter 200 operates more efficiently by separating the sorting of events from the processing of rules. This is accomplished, as described, by generating a complete, de-duplicated, list of the events that represents a superset of all the events that match all the rules. The de-duplicated list gains leverage from rules looking for the same messages, but even if no such leverage is gained, CEP alerter 200 nevertheless benefits from not having to have multiple copies of the same rule looking for the same message. Further, it is noted that where pre-sorting (i.e., de-duplicating) is not performed, threads and processes must be initiated to track a much larger data stream. In one possible implementation, the de-duplicated list is generated when each new rule is uploaded to or detected by rule engine 220. The rules in rules repository 230 are scanned and the de-duplicated list is programmatically generated and made available to input processor 210.

Input processor 210 compares the events received in incoming event streams and pulls out any events that are in the de-duplicated list. Resulting parsed event instances are then stored in input repository 240. Rules engine 220 then operates in conjunction with state machine 250 to determine the status of existing rules by iterating through the recorded events in input repository 240.

Depending on implementation, one could configure CEP alerter 200 to start with a given rule, and then iterate through the entirety of input repository 240 searching for events that pertain to that rule, and update state machine 250 accordingly. Alternatively, one could configure CEP alerter 200 to start with, e.g., the first row of input repository 240, and then run through each rule in state machine 250 to update fields therein. For example, event X appears in the first row of input repository. Rules engine 220 in cooperation with state machine 250 would then iterate through every rule in state machine 250 and update appropriate fields therein with an indication that event X has been detected. The next event in input repository 240 is event A, and so each rule in state machine 250 for which event A pertains would be updated, and so on.

By having a more consolidated listing of relevant events stored in input repository 240, it is possible for CEP alerter 200 to operate more efficiently.

For instance, in the event of a network outage or some other issue that causes rules engine 220 to not receive an event stream, rules engine 220 can make a call back to input repository 240 to requests a "replay" of the event stream that it missed (since input repository can be sorted by event stream and time). This functionality could also be extended such that CEP alerter 200 can be configured to call into a main data store (not shown and separate from input repository 240) to recall events and reprocess them if desired. This could be useful for outages but also in connection with testing to determine if a new rule functions as designed or if the "tweaking" of a given rule has had the desired impact. Further, because input repository 240 can be sorted by time, it is possible to process data, i.e., apply rules, based on event time, as opposed to the time the stored events were received by CEP alerter 200 in the first place.

If rules engine 220, or daemon, etc. (by monitoring state machine 250) detects that a series has met all the criteria for an alert, rules engine 220 (or, e.g., separate daemon as previously noted) then causes output module 260 to send an alert (and also, if so configured, to output the events to a still another memory location for further analysis).

Figure 7:
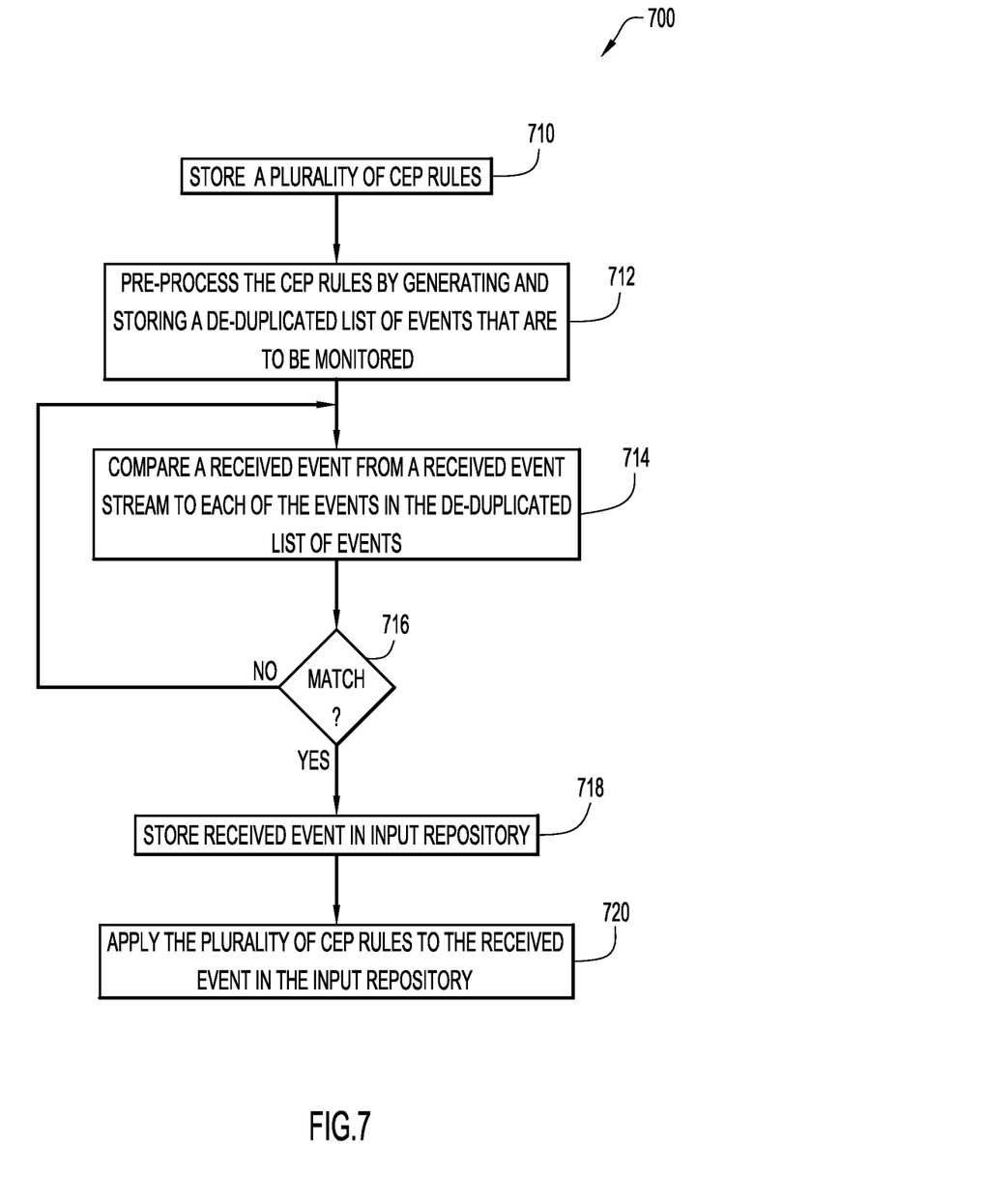
FIG. 7 depicts an example flow diagram of a series of steps for operating a CEP alerter consistent with embodiments described herein.

FIG. 7 depicts an example flow diagram of a series of steps 700 for operating CEP alerter 200 consistent with embodiments described herein. At 710, a plurality of complex event processing (CEP) rules is stored, the CEP rules being based on a plurality of events that are to be monitored. Storage may be in rules repository 230 or like storage facility. The rules themselves may be provided via a user console implemented using a general purpose computer.

At 712, the CEP rules are pre-processed to generate and store a de-duplicated list of events from the plurality of events that are to be monitored. That is, a list of events (where each event appears once in the list) that pertain to the plurality of rules is generated and stored.

At 714, a received event from a received event stream is compared to each of the events in the de-duplicated list of events.

At 716, if a match between the received event and any one of the events in the de-duplicated list of events is detected, that event instance (i.e., the received event) is stored in an input repository, such as input repository 240. If no match is found, then the process loops back to 714 for comparison of a next received event.

At 718, the plurality of CEP rules are applied to the received event in the input repository. A state machine, configured to track the satisfaction of individual rules may then be updated and, upon the satisfaction of one or more rules, an alert may be raised through one or more mechanisms.

In an embodiment, the events being monitored are logs received from network connected devices such as routers, switches and servers, among other possible devices.

According to the methodology described herein, it is possible to more efficiently analyze events in the context of complex event processing employed for security information and event management systems. By identifying events of interest via the described de-duplicated list, and capturing incoming events that match events in the de-duplicated list, it is possible to capture all relevant events in a smaller over pool of events, which can then be separately analyzed with respect to any active rules.

The systems and methods described herein may be embodied in other specific forms without departing from the spirit or essential characteristics thereof. The foregoing embodiments are therefore to be considered in all respects illustrative and not meant to be limiting.

What is claimed is:

1. A method comprising:
   storing a plurality of complex event processing (CEP) rules, the CEP rules being based on a plurality of events that are to be monitored;
   pre-processing the CEP rules by generating and storing a de-duplicated list of events from the plurality of events that are to be monitored, resulting in a separately stored de-duplicated list of events;
   comparing a received event from a received event stream to events in the separately stored de-duplicated list of events and when a match between the received event and any one of the events in the separately stored de-duplicated list of events is detected, storing the received event in an input repository; and
   applying the plurality of CEP rules to the received event in the input repository;
   wherein pre-processing the CEP rules comprises:
   identifying, in each of the plurality of CEP rules, one or more events to be detected in the received event stream that contribute to satisfaction of that CEP rule; and
   generating the de-duplicated list of events to be detected from the received event stream based on the identified events in each of the plurality of CEP rules.

2. The method of claim 1, wherein the received event from the received event stream comprises a log received from a network-connected device.

3. The method of claim 2, wherein the log is received from at least one of a server, a router, a switch, an operating system, a database, an application and a firewall.

4. The method of claim 1, wherein comparing comprises performing pattern matching between the received event from the received event stream and events in the separately stored de-duplicated list of events.

5. The method of claim 1, further comprising comparing a plurality of received events from a plurality of received event streams to each of the events in the separately stored de-duplicated list of events.

6. The method of claim 1, further comprising updating a state machine based on a result of applying the plurality of CEP rules to the received event in the input repository.

7. The method of claim 6, updating the state machine by at least one of:
 iterating through each instantiated rule in the state machine; and
 iterating through the input repository.

8. The method of claim 6, wherein the state machine is implemented as a relational database.

9. The method of claim 1, wherein the method is performed with a security information and event management (SIEM) system.

10. A system, comprising:
 a memory;
 a network interface unit; and
 a processing unit operatively in communication with the memory and the network interface,
 wherein the processing unit is configured:
 to store a plurality of complex event processing (CEP) rules, the CEP rules being based on a plurality of events that are to be monitored;
 to pre-process the CEP rules by generating and storing a de-duplicated list of events from the plurality of events that are to be monitored, resulting in a separately stored de-duplicated list of events;
 to compare a received event from a received event stream to events in the separately-stored de-duplicated list of events and when a match between the received event and any one of the events in the separately stored de-duplicated list of events is detected, store the received event in an input repository; and
 to apply the plurality of CEP rules to the received event in the input repository;
 wherein the processing unit is configured to pre-process the CEP rules by:
 identifying, in each of the plurality of CEP rules, one or more events to be detected in the received event stream that contribute to satisfaction of that CEP rule; and
 generating the de-duplicated list of events to be detected from the received event stream based on the identified events in each of the plurality of CEP rules.

11. The system of claim 10, wherein the received event from the received event stream comprises a log received from a network-connected device.

12. The system of claim 11, wherein the log is received from at least one of a server, a router, a switch, an operating system, a database, an application and a firewall.

13. The system of claim 10, wherein the processing unit is configured to perform pattern matching between the received event from the received event stream and events in the separately stored de-duplicated list of events.

14. The system of claim 10, wherein the processing unit is further configured to compare a plurality of received events from a plurality of received event streams to each of the events in the separately stored de-duplicated list of events.

15. The system of claim 10, wherein the processing unit is further configured to update a state machine in the memory based on a result of applying the plurality of CEP rules to the received event in the input repository.

16. The system of claim 15, wherein the processing unit is further configured to update the state machine by at least one of:
 iterating through each instantiated rules in the state machine; and
 iterating through the input repository.

17. The system of claim 15, wherein the state machine is implemented as a relational database.

18. The system of claim 10, wherein the system is operational with a security information and event management (SIEM) system.

19. A method comprising:
 storing a plurality of complex event processing (CEP) rules, the CEP rules being based on a plurality of events that are to be monitored;
 pre-processing the CEP rules by generating and storing a de-duplicated list of events from the plurality of events that are to be monitored, resulting in a separately stored de-duplicated list of events;
 receiving a stream of events;
 comparing individual received events in the stream of events to events in the separately stored de-duplicated list of events and, when a match between a given received event in the stream of events matches any one of the events in the separately stored de-duplicated list of events is detected, storing the given received event in an input repository, wherein each such stored given received event includes a timestamp; and
 applying the plurality of CEP rules to the events stored in the input repository based on respective timestamps thereof;
 wherein pre-processing the CEP rules comprises:
 identifying, in each of the plurality of CEP rules, one or more events to be detected in the received event stream that contribute to satisfaction of that CEP rule; and
 generating the de-duplicated list of events to be detected from the received event stream based on the identified events in each of the plurality of CEP rules.

20. The method of claim 19, further comprising sorting the events stored in the input repository to obtain sorted events, and applying the plurality of CEP rules to the sorted events.

* * * * *